US005959630A

United States Patent [19]

Takeuchi et al.

[11] Patent Number: 5,959,630

[45] Date of Patent: Sep. 28, 1999

[54] DISPLAY SCREEN PROCESSING APPARATUS AND STORAGE MEDIUM CONTAINING THEREIN PROGRAM FOR CONTROLLING DISPLAY SCREEN PROCESSING APPARATUS

[75] Inventors: Masato Takeuchi; Shuzo Kugimiya, both of Nara, Japan

[73] Assignee: Sharp Kabushiki Kaisha, Osaka, Japan

[21] Appl. No.: 09/015,766

[22] Filed: Jan. 29, 1998

[30] Foreign Application Priority Data

May 20, 1997 [JP] Japan .................................... 9-129902

[51] Int. Cl.[6] ................................ G06F 3/00; G06F 3/14

[52] U.S. Cl. .......................... 345/348; 345/357; 345/349; 345/346

[58] Field of Search .................................... 345/333, 334, 345/339, 340, 342, 346, 348, 349, 353, 357

[56] References Cited

U.S. PATENT DOCUMENTS 5,485,174 1/1996 Henshaw et al. ....................... 345/123
5,786,816 7/1998 Macrae et al. .......................... 345/339
5,874,952 2/1999 Morgan .................................. 345/328

FOREIGN PATENT DOCUMENTS

A-61-296384 12/1986 Japan .............................. G09G 1/02
A-5204369 8/1993 Japan .............................. G09G 5/36

*Primary Examiner*—Raymond J. Bayerl
*Assistant Examiner*—X. L. Bautista

[57] ABSTRACT

A display screen processing apparatus includes a display portion having a display screen; a display information acquiring section for acquiring a display information object to be displayed on the display screen; a display information dividing section for dividing the display information object into a plurality of partial display information objects on the basis of attribute information embedded in the display information object; an icon creating section for creating a split display icon for indicating positions of split display areas which are in a one-to-one correspondence with the partial display information objects within the entire display screen; a display controlling section for displaying the split display icon in a peripheral area of the display screen; and an icon designating portion for designating one of the split display areas in the split display icon. The display controlling section is adapted to display on a greater scale a partial display information object corresponding to the designated split display area on the entire display screen.

6 Claims, 9 Drawing Sheets

FIG.5

```
<HTML>
<HEAD>
<TITLE> Sharp Corporation
</TITLE>
</HEAD>
<FRAMESET COLS= "19%, 81%" FRAMEBORDER= "NO" ~~>
<FRAME SRC= "side.htm" NAME= "side" ~~>
<FRAMESET ROWS= "80%, 20%" FRAMEBORDER=~~>
<FRAME SRC= "main.htm" NAME= "main" ~~>
<FRAME SRC= "bottom.htm" NAME= "bottom" ~~>
</FRAMESET>
</FRAMESET>
<NOFRAMES>
<BODY ~>
```

DISPLAY SCREEN PROCESSING APPARATUS AND STORAGE MEDIUM CONTAINING THEREIN PROGRAM FOR CONTROLLING DISPLAY SCREEN PROCESSING APPARATUS

CROSS-REFERENCE TO RELATED APPLICATION

This application is related to Japanese application No. Hei 9(1997)-129902, filed on May. 20, 1997, whose priority is claimed under 35 USC § 119, the disclosure of which is incorporated by reference in its entirety.

BACKGROUND OF THE INVENTION

1. Field of the Invention

The present invention relates to a display screen processing apparatus and a storage medium containing therein a program for controlling the display screen processing apparatus. More particularly, the invention relates to a display screen processing apparatus and a storage medium containing therein a program for controlling the display screen processing apparatus, which is adapted to divide one display information object into a plurality of partial display information objects on the basis of attribute information embedded in the display information object and to display on a greater scale a partial display information object designated in an icon on the entire display screen.

2. Description of the Prior Art

In recent years, the widespread use of personal computers and information terminals, the extension of communication facilities and the penetration of the Internet and PC communications have provided users with opportunities to browse electric documents in various ways. Particularly, the Worldwide Web (WWW) system of the Internet features an excellent hypertext browsing function. Therefore, the number of providers that provide various services on the WWW servers has recently been increasing.

In this connection, the HTML (Hypertext Markup Language) for composition of hypertexts on the WWW system has constantly been revised and the WWW browser function has been extended. For example, a split screen display method has been developed which is adapted to integrally display a plurality of display information objects on a plurality of display areas of a display screen on the WWW browser with the use of split frames. With this method, a greater number of WWW servers (home page providers) provide hypertexts which are excellent in the browsability and operability.

As a prior art, Japanese Unexamined Patent Publication No. Hei 5(1993)-204369 proposes a partial image zoom-in method which provides a display screen splitting function. In this method, a display screen is divided into a plurality of display areas, and a display area selected from the plurality of display areas by a user is zoomed in to display on a greater scale an image previously formed in the selected display area. Thus, the user can smoothly follow the zoom-in of the selected display area by his eyes and, therefore, it is easy to find a correspondence between the images before and after the zoom-in of the display area.

Further, Japanese Unexamined Patent Publication No. Sho 61(1986)-296384 proposes a display screen controlling apparatus which is adapted to divide a display screen into a plurality of split screen areas and to display a selected one of the plural split screen areas on the entire display screen by a simple operation.

However, the aforesaid split screen displaying method employing the split frames, the method disclosed in Japanese Unexamined Patent Publication No. Hei 5(1993)-204369 and the apparatus disclosed in Japanese Unexamined Patent Publication No. Sho 61(1986)-296384 are disadvantageous in that, particularly in the case of a small size display screen, the division of the display screen according to a certain splitting format results in undesirably small split display areas thereby to deteriorate the operability.

Further, the method disclosed in Japanese Unexamined Patent Publication No. Hei 5(1993)-204369 is disadvantageous in that it is difficult to find where the enlarged image in the split display area (which is a part of the original image) is previously located in the original image. The apparatus disclosed in Japanese Unexamined Patent Publication No. Sho 61(1986)-296384 is disadvantageous in that split display areas cannot repeatedly be switched to be selectively displayed on the entire display screen, and in that the display screen configuration cannot optionally be changed for split display of a hypertext.

SUMMARY OF THE INVENTION

In view of the foregoing, the present invention provides a display screen processing apparatus and a storage medium containing therein a program for controlling the display screen processing apparatus. The apparatus and the program are adapted to perform the functions of: dividing one display information object into a plurality of partial display information objects on the basis of positional information embedded in the display information object; creating a split display icon for indicating positions of split display areas which are in a one-to-one correspondence with the partial display information objects within the entire display screen; and displaying on a greater scale a partial display information object corresponding to a split display area designated in the split display icon on the entire display screen. Thus, even if a display device having a small display screen area is employed, the display screen area can efficiently be used to ensure a browsability and operability comparable to a display device having a large display screen area. In addition, the split display areas can repeatedly be switched to display different partial display information objects on the entire display screen.

In accordance with one aspect of the present invention, there is provided a display screen processing apparatus which comprises: a display portion having a display screen; a display information acquiring section for acquiring a display information object to be displayed on the display screen; a display information dividing section for dividing the display information object into a plurality of partial display information objects on the basis of attribute information embedded in the display information object; an icon creating section for creating a split display icon for indicating positions of split display areas which are in a one-to-one correspondence with the partial display information objects within the entire display screen; a display controlling section for displaying the split display icon in a peripheral area of the display screen; and an icon designating portion for designating one of the split display areas in the split display icon, the display controlling section being adapted to display on a greater scale a partial display information object corresponding to the designated split display area on the entire display screen.

BRIEF DESCRIPTION OF THE DRAWINGS

FIG. 5 is an explanatory diagram illustrating an HTML source code list received from a WWW server in accordance with an embodiment of the present invention;

DETAILED DESCRIPTION OF THE PREFERRED EMBODIMENTS

Figure 1:
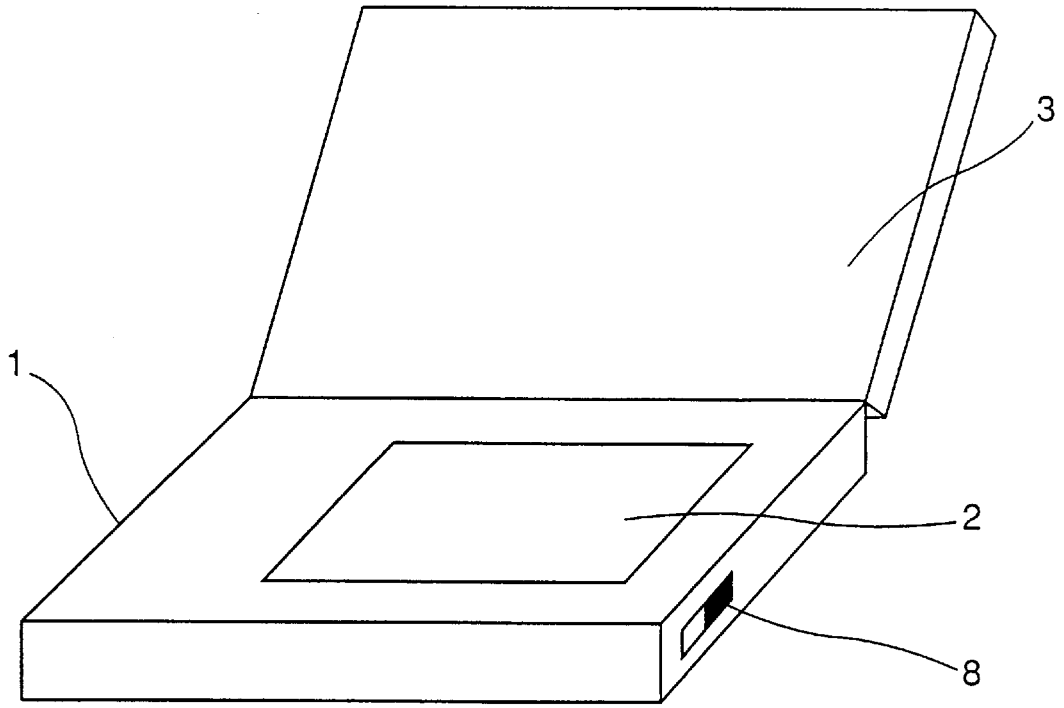
FIG. 1 is a perspective view illustrating the appearance of a display screen processing apparatus according to the present invention.

The display screen processing apparatus according to the present invention comprises: a display portion having a display screen; a display information acquiring section for acquiring a display information object to be displayed on the display screen; a display information dividing section for dividing the display information object into a plurality of partial display information objects on the basis of attribute information embedded in the display information object; an icon creating section for creating a split display icon for indicating positions of split display areas which are in a one-to-one correspondence with the partial display information objects within the entire display screen; a display controlling section for displaying the split display icon in a peripheral area of the display screen; and an icon designating portion for designating one of the split display areas in the split display icon; the display controlling section being adapted to display on a greater scale a partial display information object corresponding to the designated split display area on the entire display screen.

In the present invention, the display portion may comprise a liquid crystal circuit and an LCD display. The display information acquiring section, the display information dividing section, the icon creating section and the display controlling section may be comprised of a microprocessor including a CPU, a ROM, a RAM and I/O ports. The icon designating portion may be comprised of a pen and a transparent tablet formed integrally with the display screen. The split display icon, which is composed of data in an icon form, is created by the icon creating section and displayed in the peripheral portion of the display screen.

The apparatus of the present invention performs the functions of: dividing one display information object into a plurality of partial display information objects on the basis of positional information embedded in the display information object; creating a split display icon for indicating positions of split display areas which are in a one-to-one correspondence with the partial display information objects within the entire display screen; and displaying on a greater scale a partial display information object corresponding to a split display area designated in the split display icon on the entire display screen. Thus, even if a display device having a small display screen area is employed, the display screen area can efficiently be used to ensure a browsability and operability comparable to a display device having a large display screen area. In addition, the split display areas can repeatedly be switched to display different partial display information objects on the entire display screen.

Preferably, the apparatus further includes a display format selecting portion for selecting either one of a first display format and a second display format, the first display format allowing the display information object to be displayed on the entire display screen, the second display format allowing the partial display information object corresponding to the split display area designated in the split display icon to be displayed on the entire display screen. In this case, the display controlling section is constructed such that, if the second display format is selected by the display format selecting portion, the split display icon is displayed in the peripheral portion of the display screen and, if the first display format is selected by the display format selecting portion, the split display icon is not displayed on the display screen.

In this arrangement, the display format selecting portion is comprised of the pen and the transparent tablet formed integrally with the display screen.

This arrangement permits a user to select either the first display format which allows the display information object to be displayed on the entire display screen or the second display format which allows the partial display information object corresponding to the split display area designated in the split display icon to be displayed on a greater scale on the entire display screen, by operating the display format selecting portion. In addition, the user can readily check the current display format on the basis of the presence or absence of the split display icon on the display screen.

The display format selecting portion preferably includes a selection button for indicating its display format selecting function and a selection status. In this case, the display controlling section is adapted to display the selection button in a peripheral portion of the display screen and to alternately switch between the first display format and the second display format on the basis of the status of the selection button.

In this arrangement, the selection button of the display format selecting portion, which is composed of data in a button form, is preliminarily stored in the ROM and displayed in the peripheral portion of the display screen.

This arrangement allows the user to alternately switch between the first display format and the second display format by selecting the selection button of the display format selecting portion, thereby obviating a need for performing a complicated operation.

Preferably, the display information acquiring section further includes an interface portion that allows for communications with a WWW server storing therein HTML information of a hypertext via a communication network. In this case, the display information acquiring section is adapted to acquire the HTML information as the display information object via the interface portion. In this arrangement, the interface portion comprises a modular portion, a modular controlling section and a protocol controlling section.

This arrangement permits the apparatus to acquire an HTML information object of a hypertext as the display information object from a WWW server.

The display information dividing section is preferably adapted to divide one HTML information object into a plurality of partial display information objects on the basis of column frame information and row frame information embedded in the HTML information object acquired by the display information acquiring section.

With this arrangement, the HTML information object can be divided into the plurality of partial display information objects by analyzing the HTML information object on the basis of the column frame information and the row frame information embedded in the HTML information object.

The present invention will hereinafter be described in detail by way of embodiments thereof with reference to the attached drawings. It should be understood that the invention be not limited to these embodiments. The embodiments of the invention are directed to a split display process for displaying an HTML information object of a hypertext received from a WWW server on the Internet.

FIG. 1 is a perspective view illustrating the appearance of a display screen processing apparatus according to the present invention. In FIG. 1, there are shown a main body cabinet 1, an input-output portion 2, a cover 3 and a main body power source switch 8. The input-output portion 2 is provided on the top face of the main body cabinet 1, and has a display portion and an input portion having a transparent tablet integrally formed on the display portion. An infrared radiation communication portion (not shown), a pen holding portion (not shown) and the like are also provided on the top face of the main body cabinet 1. The main body cabinet 1 incorporates therein a control section for controlling the input-output portion 2, the infrared radiation communication portion, an interface portion and the like, and a main body power source for applying voltages to the respective components.

The cover 3 is pivotally connected to an edge of the main body cabinet 1 by a hinge, so that the input-output portion 2 is covered therewith to be protected during transportation of the apparatus.

The main body power source switch 8 is provided on a side wall of the main body cabinet 1, and operated to turn on and off the voltage application from the power source.

Figure 2:
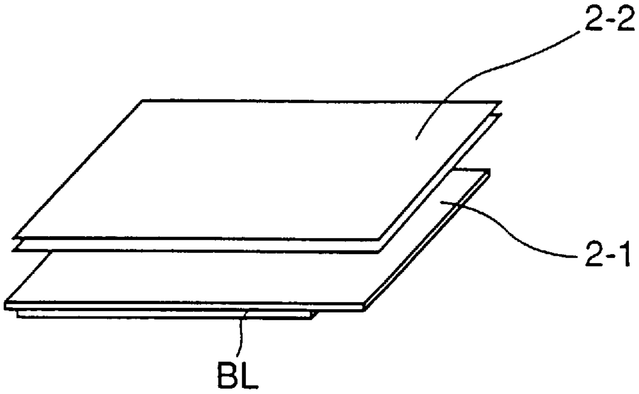
FIG. 2 is a perspective view illustrating the construction of an input-output portion of the display screen processing apparatus of FIG. 1.

FIG. 2 is a perspective view illustrating the construction of the input-output portion shown in FIG. 1. As shown in FIG. 2, the input-output portion 2 includes a thin liquid crystal display portion 2-1 of a matrix type capable of displaying character information and image information in a dot form and a transparent tablet portion 2-2 formed integrally with the liquid crystal display portion 2-1 and having a size large enough to cover the liquid crystal display portion 2-1.

As required, a back light BL such as of an EL panel may be provided on the rear face of the liquid crystal display portion 2-1.

The transparent tablet portion 2-2 comprises a pair of transparent sheets, transparent electrodes formed on the interior surfaces of the transparent sheets for defining XY coordinates, and spacers of small projections regularly printed on the interior surfaces of the transparent sheets for preventing the respective electrodes from coming in contact with each other under normal conditions. When the transparent tablet portion 2-2 is touched with a finger or a pen, the transparent electrodes in the touched portion of the transparent tablet portion 2-2 are brought in contact with each other so that information indicative of the position of the touched portion can be determined. Further, display information designated by a user on the liquid crystal display portion 2-1 can be detected by synchronizing the display information displayed on the liquid crystal display portion 2-1 with the positional information.

Figure 3:
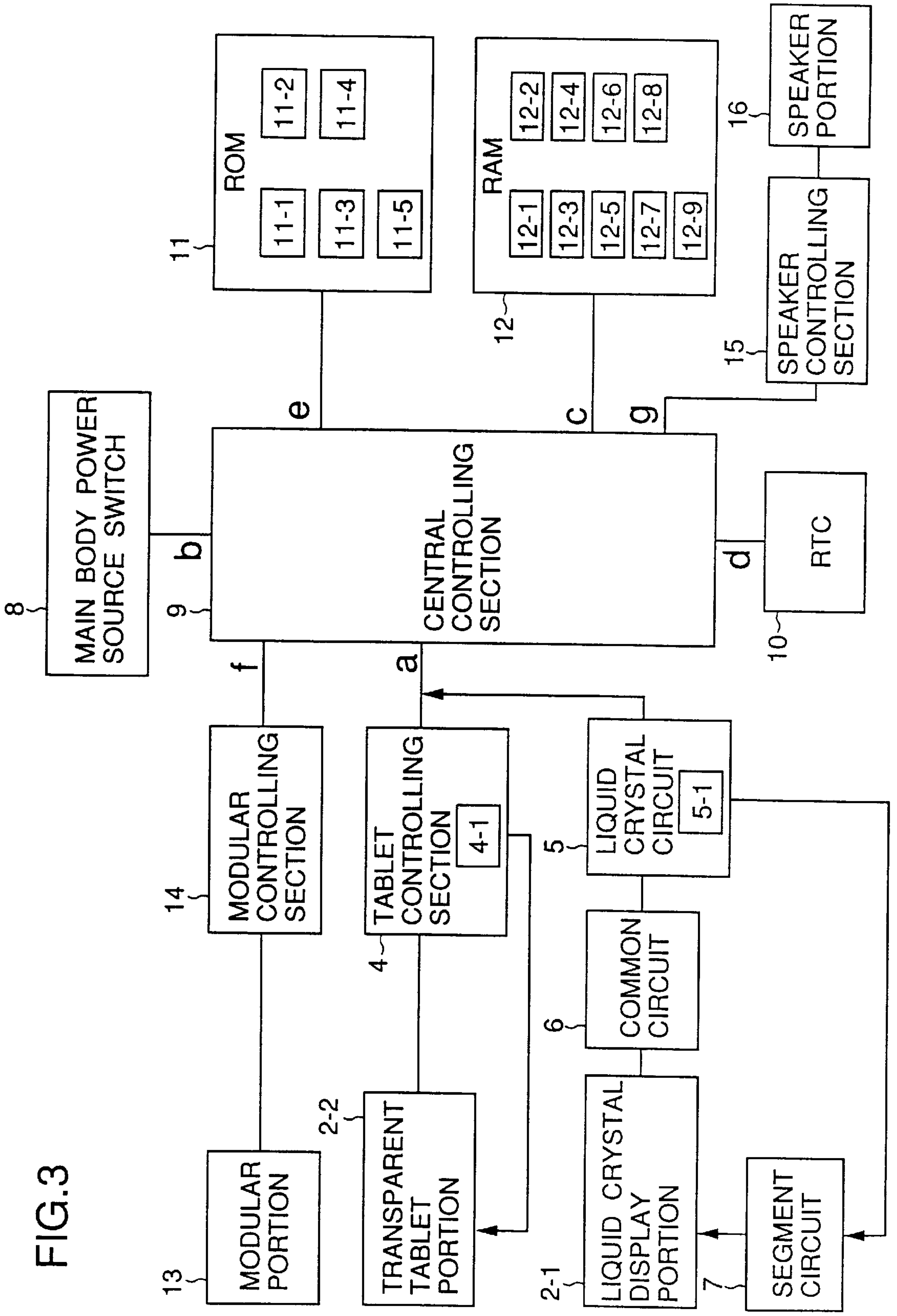
FIG. 3 is a block diagram illustrating the overall construction of the display screen processing apparatus.

FIG. 3 is a block diagram illustrating the overall construction of the display screen processing apparatus according to the present invention. As shown in FIG. 3, the apparatus of the present invention includes the liquid crystal display portion 2-1, the transparent tablet portion 2-2, a tablet controlling section 4, a liquid crystal circuit 5, a common circuit 6, a segment circuit 7, the main body power source switch 8, a central controlling section 9, an RTC 10, a ROM 11, a RAM 12, a modular portion 13, a modular controlling section 14, a speaker controlling section 15 and a speaker portion 16.

The tablet controlling section 4 scans the transparent electrodes of the transparent tablet portion 2-2 while synchronizing the display information displayed on the liquid crystal display portion 2-1 with the positional information to determine the coordinates of the position of a portion of the transparent tablet portion 2-2 touched with a finger or a pen where transparent electrodes are brought in contact with each other.

The liquid crystal circuit 5 stores dot positions to be activated on the liquid crystal display portion as a bit map in a display memory, and sends driving signals corresponding to display information to the common circuit 6 and the segment circuit 7 to drive the liquid crystal display portion.

The central controlling section 9 is comprised of a microprocessor including an CPU and I/O ports. The CPU is connected to the tablet controlling section 4 via a control line a, to the main body power source switch 8 via a control line b, to the RAM 12 via a control line c, to the RTC 10 via a control line d, to the ROM 11 via a control line e, to the modular controlling section 14 via a control line f and to the speaker controlling section 15 via a control line g, and controls input information and output information of the respective components in accordance with program commands from the ROM 11.

The RTC (real time clock) 10 clocks the real time by utilizing clock signals (not shown), and outputs information regarding the current time, date, month and year to the central controlling section 9.

The ROM 11 has program areas storing therein programs for controlling the respective components by the central controlling section 9. More specifically, the program areas respectively store therein programs which perform functions as a protocol controlling section 11-1, an HTML controlling section 11-2, a column frame analyzing section 11-3, a row frame analyzing section 11-4 and an icon creating section 11-5.

The RAM 12 includes memory areas which respectively function as a WWW browser cache memory 12-1, a screen status memory 12-2, a column frame analysis result memory 12-3, a row frame analysis result memory 12-4, an address designation memory 12-5, an icon memory 12-6, a frame display button memory 12-7, a no-frame display button memory 12-8 and a display designation memory 12-9.

The frame display button memory 12-7 and the no-frame display button memory 12-8 function as a display format selection button memory.

In accordance with the present invention, the display screen processing apparatus shown in FIG. 3 may be controlled by a computer program which is stored in a storage medium, e.g., a memory card such as of an EEPROM, a floppy disk, a hard disk, an MD or a CD-ROM, and used as a general purpose program in an external storage device. The storage medium according to the present invention contains therein the computer program for controlling the display screen processing apparatus having a display screen, the computer program performing the functions of: causing a computer operation to acquire a display information object to be displayed on the display screen by means of a display information acquiring section; causing a computer operation to divide the display information object into a plurality of partial display information objects on the basis of attribute information embedded in the display information object by means of a display information dividing section; causing a computer operation to create a split display icon for indicating positions of a plurality of split display areas which are in a one-to-one correspondence with the partial display information objects within the entire display screen by means of an icon creating section; causing a computer operation to display the split display icon in a peripheral area of the display screen by means of a display controlling section; and, when one of the split display areas in the split display icon is designated by means of an icon designating portion, causing a computer operation to display on a greater scale a partial display information object corresponding to the designated split display area on the entire display screen.

In the present invention, the display information acquiring section is comprised of the central controlling section (CPU) 9, the modular portion 13, the modular controlling section 14, and the protocol controlling section 11-1 and the HTML controlling section 11-2 in the ROM 11.

The display information dividing section is comprised of the central controlling section (CPU) 9, the column frame analyzing section 11-3, the row frame analyzing section 11-4, the column frame analysis result memory 12-3, and the row frame analysis result memory 12-4.

The icon creating section and the display controlling section are comprised of the central controlling section (CPU) 9, the ROM 11 and the RAM 12.

The icon designating portion is comprised of the transparent tablet portion 2-2 and the tablet controlling section 4.

Figure 4:
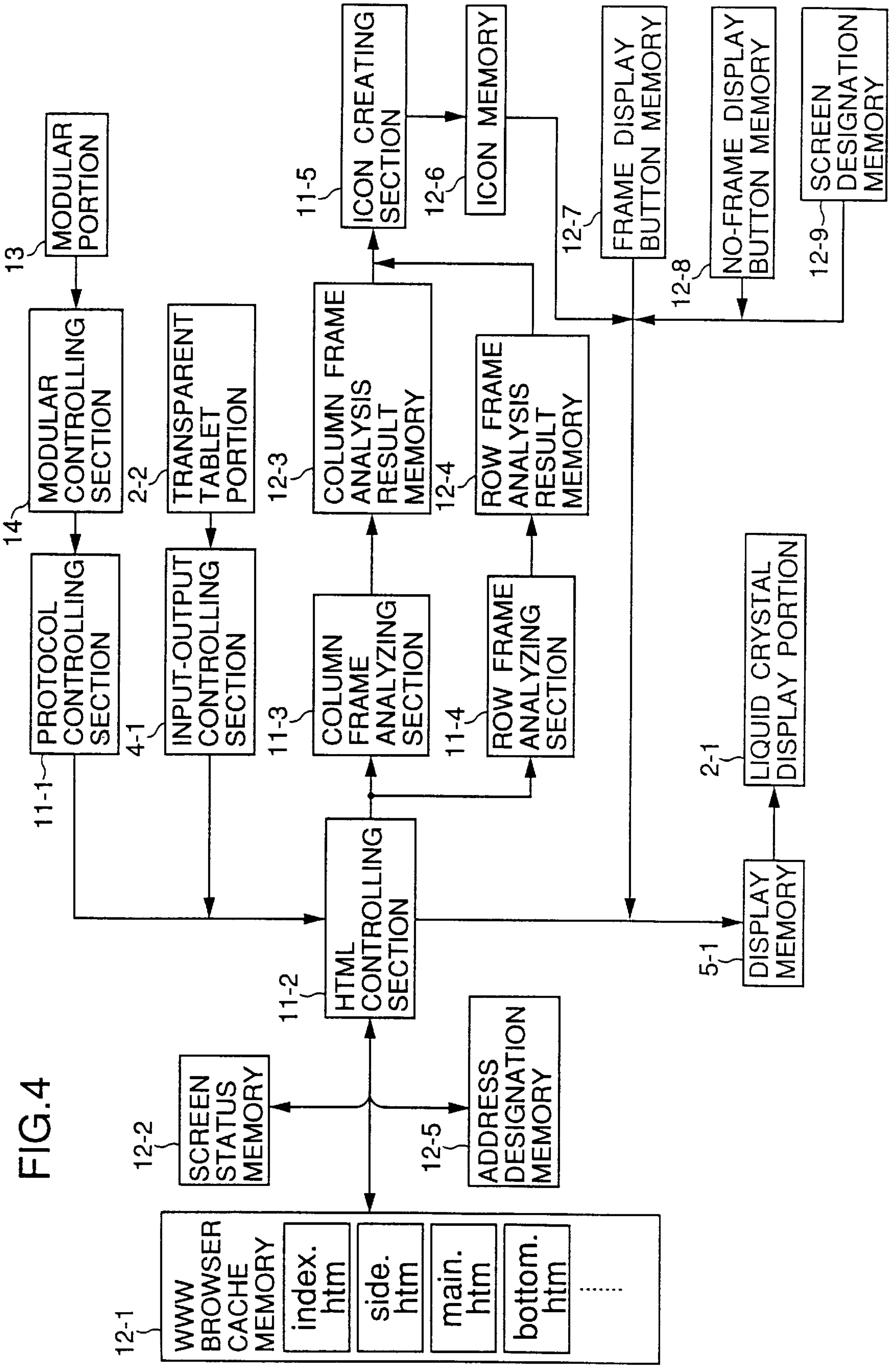
FIG. 4 is a block diagram illustrating the construction of the display screen processing apparatus of FIG. 3 on a function basis.

FIG. 4 is a block diagram illustrating the construction of the display screen processing apparatus of FIG. 3 on a function basis. FIG. 5 is an explanatory diagram illustrating an HTML source code list received from a WWW server. It is herein assumed that HTML source codes specifying column and row frame division are embedded in HTML information of a hypertext received from the WWW server.

In FIG. 4, the modular portion 13, the modular controlling section 14 and the protocol controlling section 11-1 function as an interface portion which permits the HTML controlling section 11-2 to communicate with the WWW server via a communication network.

The HTML controlling section 11-2 designates the address of the WWW server to be accessed, and receives the HTML information and the hypertext from the WWW server. The address is stored in the address designation memory 12-5.

HTML information "index.htm", "main.htm", "side.htm" and "bottom.htm" and relevant data in the HTML information received from the WWW server are temporarily stored in the WWW browser cache memory 12-1.

The column frame analyzing section 11-3 analyzes the HTML information received by the HTML controlling section 11-2 to check for the presence of a COLS attribute (column attribute), the number of parameters of the COLS attribute and a display ratio in "FRAMESET" shown in FIG. 5. The analysis results are stored in the column frame analysis result memory 12-3.

The row frame analyzing section 11-4 analyzes the HTML information received from the WWW server by the HTML controlling section 11-2 to check for the presence of a ROWS attribute (row attribute), the number of parameters of the ROWS attribute and a display ratio in "FRAMESET" shown in FIG. 5. The analysis results are stored in the row frame analysis result memory 12-4.

The screen status memory 12-2 stores therein flags indicative of the presence or absence of the ROWS attribute and the COLS attribute.

The icon creating section 11-5 reads out the results of the column frame analysis and the row frame analysis on the HTML information from the column frame analysis result memory 12-3 and the row frame analysis result memory 12-4. Then, the icon creating section 11-5 creates a split display icon as shown by an arrow in FIG. 7 on the basis of the analysis results thus read out, and stores the icon in the icon memory 12-6.

The input controlling section 4-1 reads the coordinates of the position of a portion of the transparent tablet portion 2-2 touched with the pen.

Figure 6:
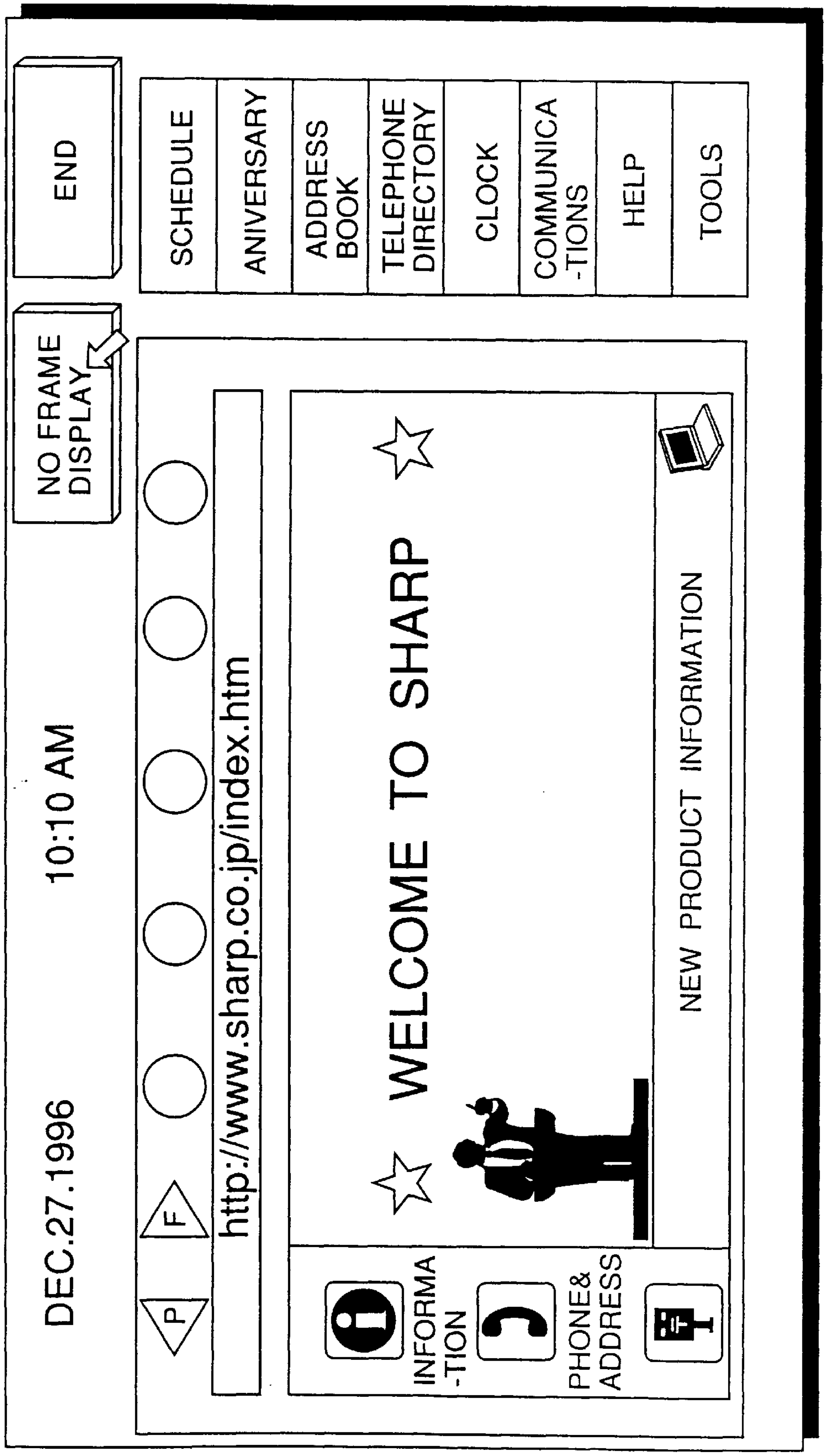
FIG. 6 is an explanatory diagram illustrating an exemplary image of a WWW browser operation screen in accordance with the embodiment.

The no-frame display button memory 12-8 stores therein a no-frame display selection button as shown in FIG. 6. This selection button indicates that the first display format is currently employed which allows the HTML information (display information object) to be displayed on the entire display screen, and is used to switch the display format to the second display format.

FIG. 6 is an explanatory diagram illustrating an exemplary image of a WWW browser operation screen in accordance with the embodiment.

Figure 7:
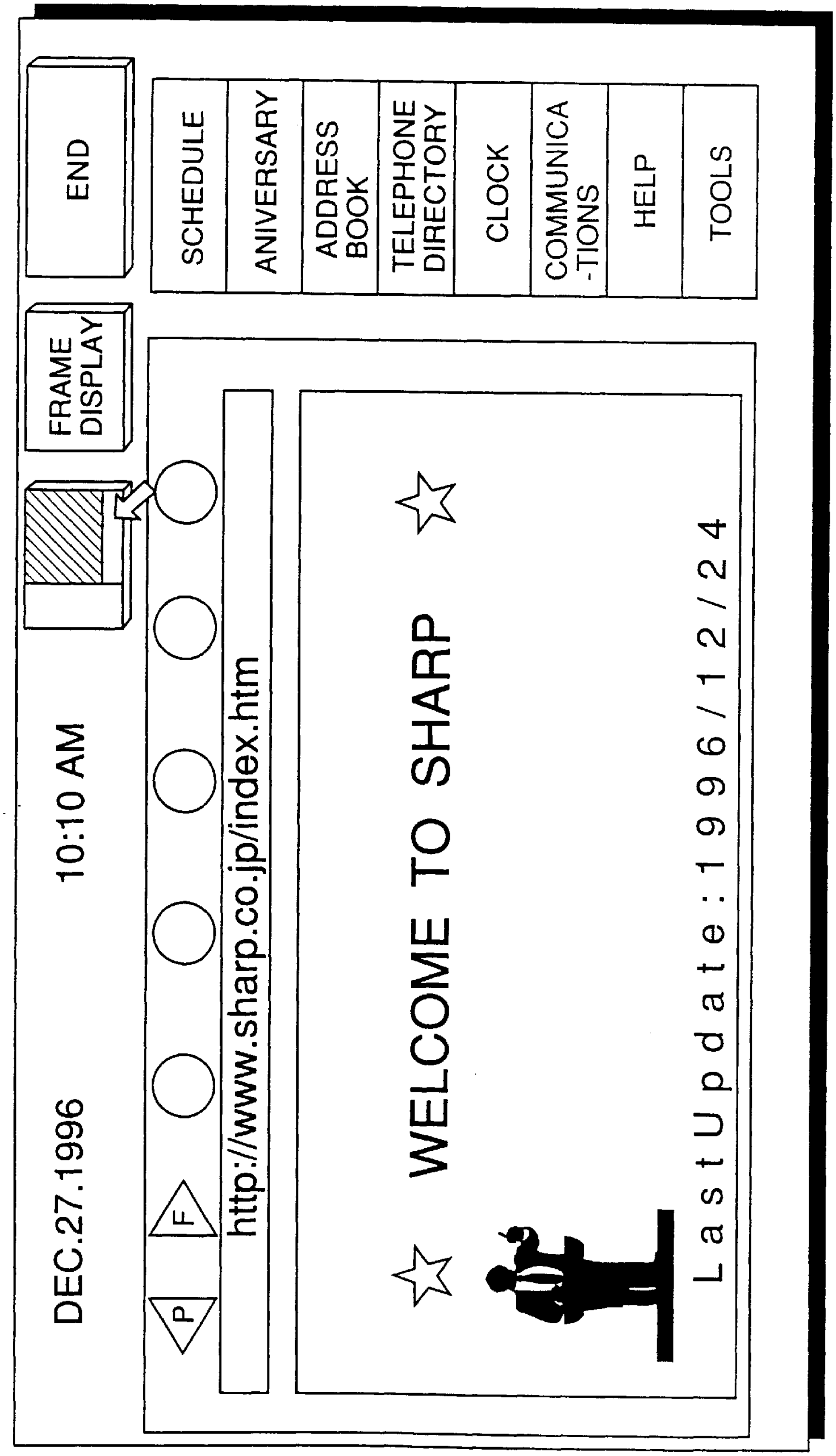
FIG. 7 is an explanatory diagram illustrating an exemplary full screen image which represents a portion of HTML information corresponding to a main display area designated in a split display icon in accordance with the embodiment.

The frame display button memory 12-7 stores therein a frame display selection button as shown in FIG. 7. This selection button indicates that the second display format is currently employed which allows a portion of the HTML information (partial display information object) corresponding to a split display area designated in the split display icon to be displayed on a greater scale on the entire display screen, and is used to switch the display format to the first display format.

It is noted that FIG. 7 is an explanatory diagram illustrating an exemplary full screen image representing a portion of the HTML information corresponding to a main display area designated in the split display icon in accordance with the embodiment.

Embodiment 1

Figure 9:
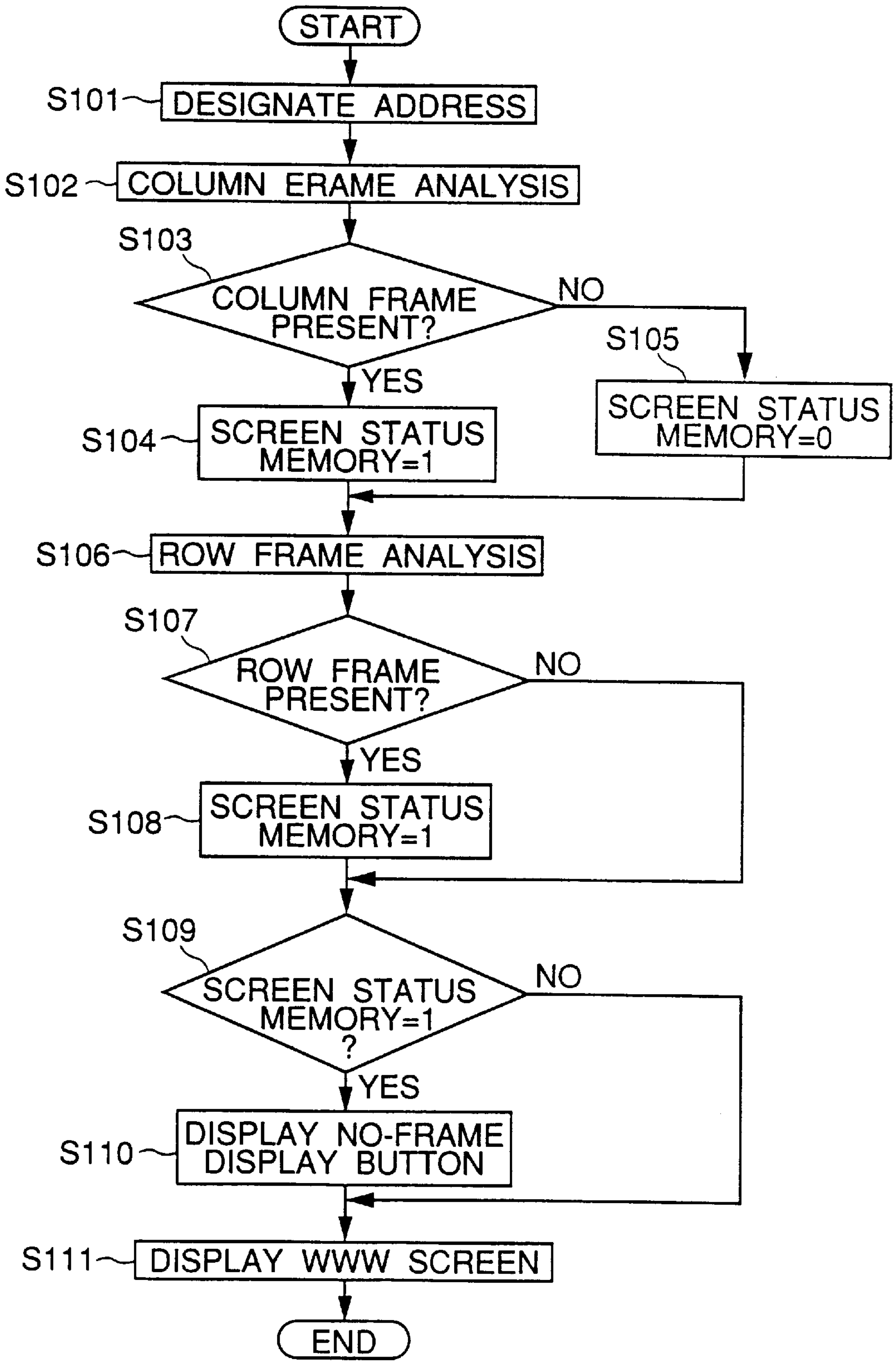
FIG. 9 is a flow chart illustrating a WWW browser start-up process and an HTML information display screen process in accordance with the embodiment.

FIG. 9 is a flow chart illustrating a WWW browser start-up process and a display screen process in accordance with Embodiment 1. With reference to Steps S101 through S111 in FIG. 9, there will hereinafter be described a process for starting up the WWW browser and displaying the WWW browser operation screen shown in FIG. 6.

Step S101: The HTML controlling section 11-2 designates the address of the WWW server to be accessed (e.g., "http://www/sharp.co.jp/index.htm" shown in FIG. 6). The address is stored in the address designation memory 12-5.

Step S102: The HTML controlling section 11-2 accesses the WWW server at the designated address, and receives HTML information from the WWW server via the modular portion 13, the modular controlling section 14 and the protocol controlling section 11-1. Then, HTML information "index.htm" and files "main.htm", "side.htm" and "bottom-.htm" designated as source attributes (SRC= . . . ) of "index.htm" as shown in FIG. 5 are temporarily stored in the WWW browser cache memory 12-1. Then, the column frame analyzing section 11-3 analyzes the HTML information received from the WWW server by the HTML controlling section 11-2 to check for the presence of the COLS attribute (column attribute) the number of parameters of the COLS attribute and the display ratio in "FRAMESET" shown in FIG. 5. The analysis results are stored in the column frame analysis result memory 12-3.

Step S103: The HTML controlling section 11-2 retrieves the results of the analysis obtained in Step S102 from the column frame analysis result memory 12-3 to check if the COLS attribute is present. If the COLS attribute is present, the process goes to Step S104. If the COLS attribute is absent, the process goes to Step S105.

Step 104: Where the COLS attribute is present in the column frame analysis result memory 12-3, the HTML controlling section 11-2 sets a flag "1" in the screen status memory 12-2.

Step S105: Where the COLS attribute is absent in the column frame analysis result memory 12-3, the HTML controlling section 11-2 sets a flag "0" in the screen status memory 12-2.

Step S106: The row frame analyzing section 11-4 analyzes the HTML information received from the WWW server by the HTML controlling section 11-2 to check for the presence of the ROWS attribute (row attribute), the number of parameters of the ROWS attribute and the display ratio in "FRAMESET" shown in FIG. 5. The analysis results are stored in the row frame analysis result memory 12-4.

Step S107: The HTML controlling section 11-2 retrieves the results of the analysis obtained in Step S106 from the row frame analysis result memory 12-4 to check if the ROWS attribute (row attribute) is present. If the ROWS attribute is present, the process goes to Step S108. If the ROWS attribute is absent, the process goes to Step S109.

Step 108: Where the ROWS attribute is present in the row frame analysis result memory 12-4, the HTML controlling section 11-2 sets a flag "1" in the screen status memory 12-2.

Step S109: The flag set in the screen status memory 12-2 in Step S104 or S108 is checked. If the screen status memory 12-2 retains the flag "1", the process goes to Step S110. If the screen status memory 12-2 does not retain the flag "1", the process goes to Step S111.

Step S110: The no-frame display button as indicated by the arrow in FIG. 6 is read out of the no-frame display button memory 12-8 and displayed in a guidance display area of the display screen.

Step S111: The WWW browser operation screen is displayed on the display screen.

Thus, the WWW browser is started up and the WWW browser operation screen shown in FIG. 6 is displayed.

Figure 10:
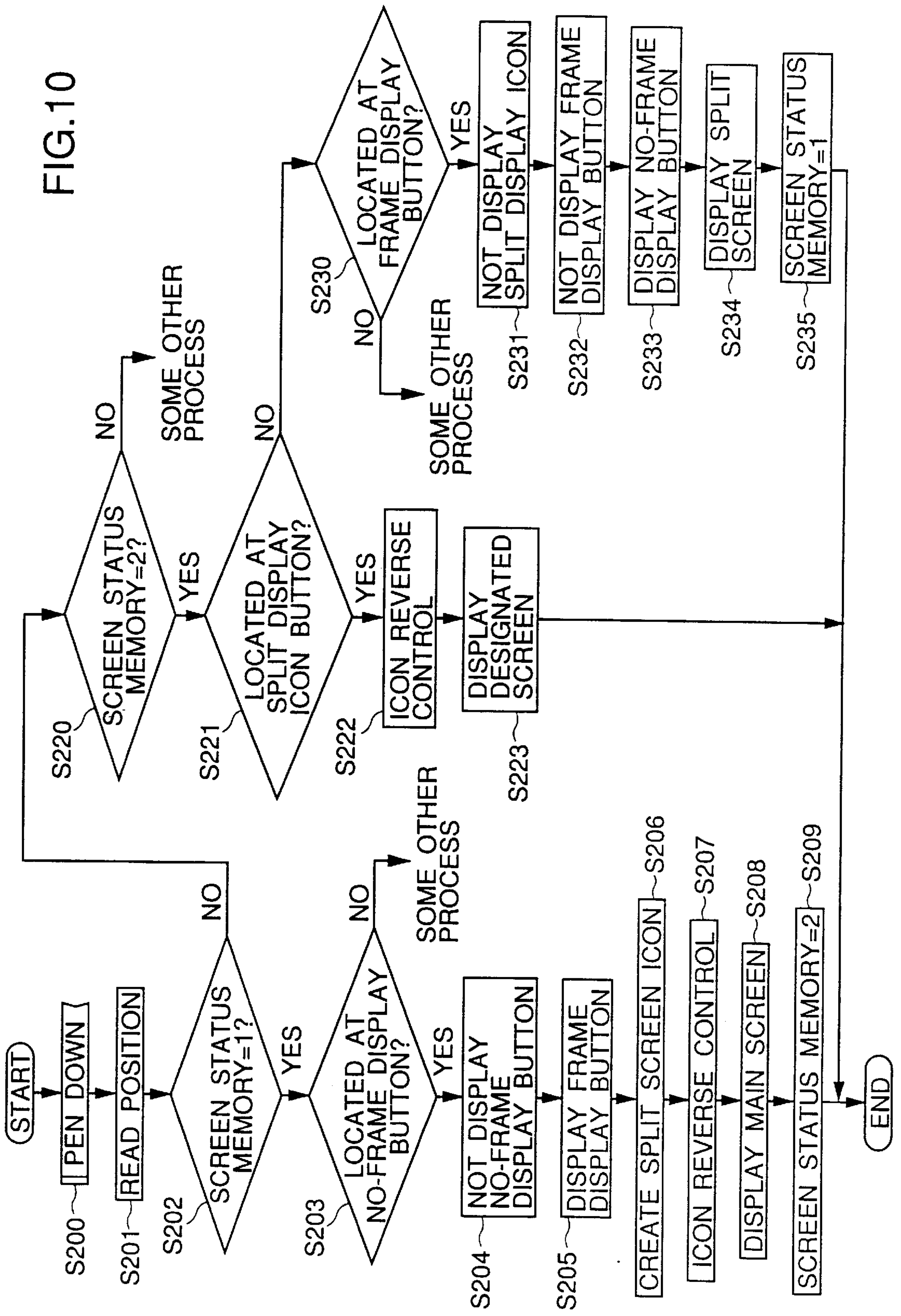
FIG. 10 is a flow chart illustrating a WWW browser display switching process in accordance with the embodiment.

FIG. 10 is a flow chart illustrating a WWW browser display switching process in accordance with Embodiment 1. With reference to Steps S200 through S208 in FIG. 10, there will hereinafter be described a process for switching the display status from the WWW browser operation screen shown in FIG. 6 to display a portion of the HTML information corresponding to a main display area designated in the split display icon on the entire display screen as shown in FIG. 7.

Step S200: When a user touches the no-frame display button with the pen with the WWW browser operation screen displayed as shown in FIG. 6, interruption information is received by the transparent tablet portion 2-2 to start a process sequence from Step S201.

Step S201: The coordinates of the position of a portion of the transparent tablet portion 2-2 touched with the pen is read into the input-output controlling section 4-1.

Step S202: The HTML controlling section 11-2 checks the flag in the screen status memory 12-2. If the screen status memory 12-2 retains the flag "1", the process goes to Step S203. If the screen status memory 12-2 does not retain the flag "1", the process goes to Step S220.

Step S203: The HTML controlling section 11-2 checks the coordinates read in Step S201. If the coordinates correspond to the position of the no-frame display button, the process goes to Step S204. If the coordinates do not correspond to the position of the no-frame display button, some other process is performed.

Step S204: The liquid crystal display portion 2-1 erases the no-frame display button displayed on the guidance display area (shown in an upper right portion of FIG. 6).

Step S205: The liquid crystal display portion 2-1 reads out the frame display button from the frame display button memory 12-7 and displays the frame display button on the guidance display area.

Step S206: The icon creating section 11-5 reads out the results of the column frame analysis and the row frame analysis on the HTML information performed in Steps S102 and S106 in FIG. 9 from the column frame analysis result memory 12-3 and the row frame analysis result memory 12-4. Then, the icon creating section 11-5 creates a split display icon on the basis of the analysis results thus read out, and stores the split display icon in the icon memory 12-6.

Step S207: The liquid crystal display portion 2-1 displays the split display icon on the guidance display area, and then displays a main display area (shaded portion indicated by an arrow in FIG. 7) in reverse in the split display icon. At the same time, designation information indicative of the main display area is stored in the display designation memory 12-9.

Step S208: The liquid crystal display portion 2-1 confirms on the basis of the designation information in the display designation memory 12-9 that the main display area is currently designated. Then, the liquid crystal display portion 2-1 reads out hypertext data of "WELCOME TO SHARP" (which corresponds to "main.htm" in the HTML information) as display data from the WWW browser cache memory 12-1 and displays "WELCOME TO SHARP" on the entire display screen (see FIG. 7).

Step S209: A flag "2" is set in the screen status memory 12-2, and the process ends.

Thus, the split display icon for the WWW browser is displayed in the guidance area to designate the display of the hypertext data in the main display area, and the hypertext data of "WELCOME TO SHARP" corresponding to the main display area is displayed on the entire display screen. Therefore, the display status where the WWW browser operation screen is displayed can arbitrarily be switched to the display status where a portion of the HTML information corresponding to a split display area designated in the split display icon is displayed on the entire display screen.

Embodiment 2

Figure 8:
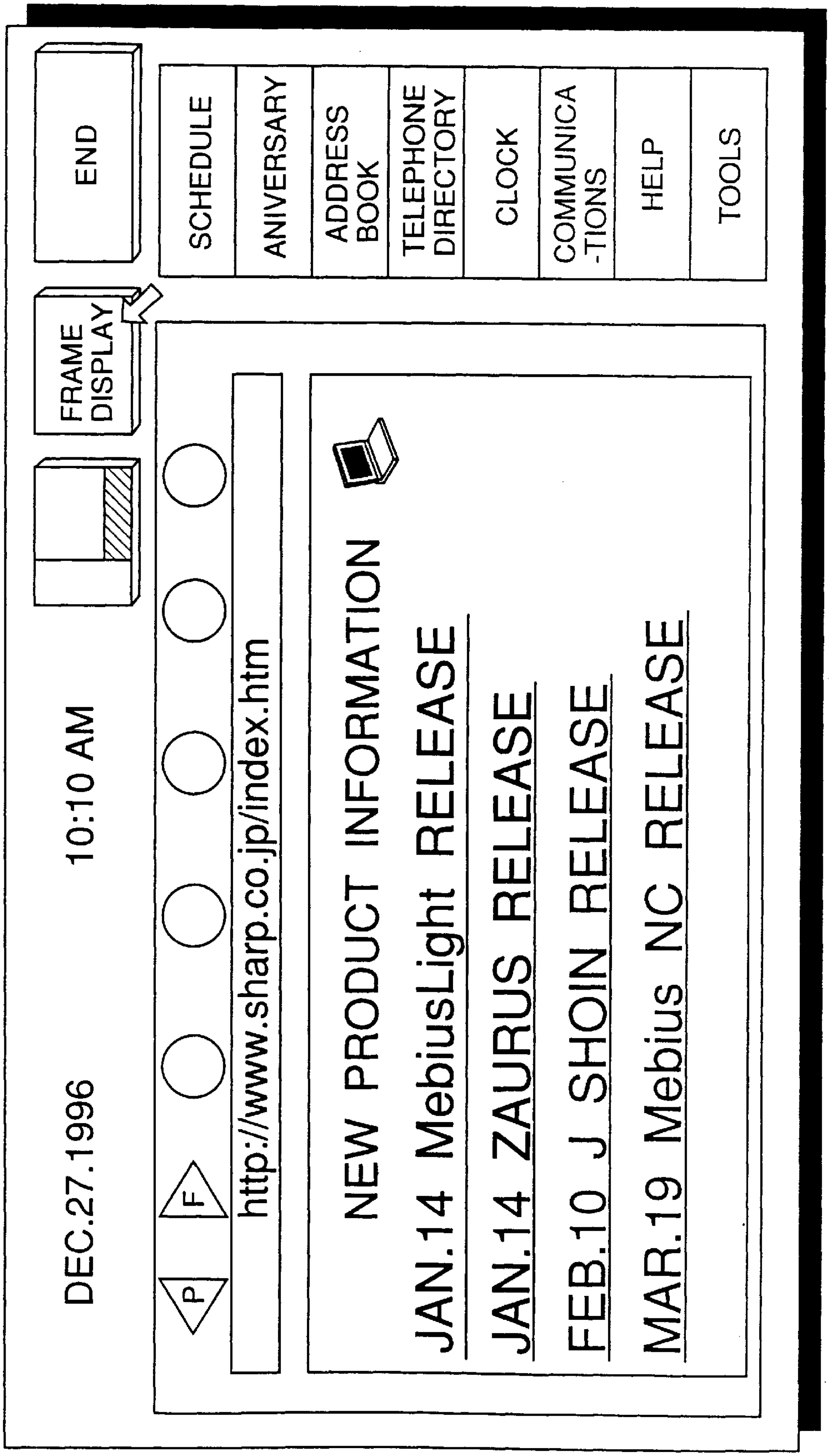
FIG. 8 is an explanatory diagram illustrating an exemplary full screen image which represents a portion of the HTML information corresponding to an auxiliary display area designated in the split display icon in accordance with the embodiment.

With reference to Steps S220 through S223 in FIG. 10, there will hereinafter be described a process for switching the display status from the WWW browser display screen shown in FIG. 6 or 7 to display HTML display data of "NEW PRODUCT INFORMATION" corresponding to an auxiliary display area designated in the split display icon on the entire display screen as shown in FIG. 8.

FIG. 8 is an explanatory diagram illustrating an exemplary full screen image representing a portion of the HTML information corresponding to the auxiliary display area designated in the split display icon in accordance with Embodiment 2.

Since the process sequence from Step S200 to Step S202 is the same as that of Embodiment 1, no explanation will be given thereto, but the process sequence from Step S220 will be described.

Step S220: The HTML controlling section 11-2 checks the flag in the screen status memory 12-2. If the screen status memory retains the flag "2", the process goes to Step S221. If the screen status memory does not retain the flag "2", some other process is performed.

Step S221: The HTML controlling section 11-2 checks the coordinates read in Step S201. If the coordinates correspond to the position of the split display icon, the process goes to Step S222. If the coordinates do not correspond to the position of the split display icon, the process goes to Step S230.

Step S222: The liquid crystal display portion 2-1 displays the split display icon in the guidance area, and then displays an auxiliary display area (shaded portion indicated by an arrow in FIG. 7) in reverse in the split display icon. At the same time, designation information indicative of the auxiliary display area is stored in the display designation memory 12-9.

Step S223: The liquid crystal display portion 2-1 confirms on the basis of the designation information in the display designation memory 12-9 that the auxiliary display area is currently designated. Then, the liquid crystal display portion 2-1 reads out hypertext data of "NEW PRODUCT INFORMATION" (which corresponds to "bottom. htm" in the HTML information) as display data from the WWW browser cache memory 12-1 and displays "NEW PRODUCT INFORMATION" on the entire display screen (see FIG. 8).

Thus, the split display icon for the WWW browser is displayed in the guidance display area to designate the display of the hypertext data in the auxiliary display area, and the hypertext data of "NEW PRODUCT INFORMATION" corresponding to the auxiliary display area is displayed on the entire display screen. Therefore, the display status where a portion of the HTML information corresponding to one split display area previously designated in the split display icon is displayed on the entire display screen can arbitrarily be switched to the display status where another portion of the HTML information corresponding to another split display area designated in the split display icon is displayed on the entire display screen.

Embodiment 3

With reference to Steps S230 through S235 in FIG. 10, there will hereinafter be described a return process for switching the display status from the WWW browser display screen shown in FIG. 7 or 8 to display the WWW browser operation screen shown in FIG. 6.

Since the process sequence from Step S200 to Step S221 is the same as that of Embodiment 2, no explanation will be given thereto, but the process sequence from Step S230 will be described.

Step S230: The HTML controlling section 11-2 checks the coordinates read in Step S201. If the coordinates correspond to the position of the frame display button, the process goes to Step S231. If the coordinates do not correspond to the position of the frame display button, some other process is performed.

Step S231: The liquid crystal display portion 2-1 deactivates the split display icon on the guidance display area.

Step S232: The liquid crystal display portion 2-1 deactivates the frame display button on the guidance display area.

Step S233: The liquid crystal display portion 2-1 reads out the no-frame display button from the no-frame display button memory 12-8 to display the no-frame display button on the display screen.

Step S234: On the basis of the results of the column frame analysis and the row frame analysis obtained in Steps S102 and S106 in FIG. 9 and stored in the column frame analysis result memory 12-3 and the row frame analysis result memory 12-4, all the HTML information ("side.htm, "main.htm" and "bottom.htm" in FIG. 5) in the split display areas are read out of the WWW browser cache memory 12-1 and displayed on the entire display screen.

Step S235: A flag "1" is set in the display status memory, and the process ends.

Thus, the display status where a portion of the HTML information corresponding to the split display area designated in the split display icon is displayed on the entire display screen can arbitrarily be switched to the display status where the WWW browser operation screen is displayed.

In accordance with the present invention, the display screen processing apparatus and the program stored in the storage medium are adapted to perform the functions of: dividing one display information object into a plurality of partial display information objects on the basis of positional information embedded in the display information object; creating a split display icon for indicating the positional relationship between the respective partial display information objects and split display areas in the icon; and displaying on a greater scale a partial display information object designated in the split display icon on the entire display screen. Thus, even if a display device having a small display screen area is employed, the display screen area can efficiently be used to ensure a browsability and operability comparable to a display device having a large display screen area. In addition, the split display areas can repeatedly be switched to display different partial display information objects on the entire display screen. On the basis of the split display area currently designated in the split display icon, a user can keep track of where the currently displayed partial display information object is originally located within the entire display information object when the display information object is displayed on the entire display screen.

What is claimed is:

1. A display screen processing apparatus comprising:

a display portion having a display screen;

a display information acquiring section for acquiring a display information object to be displayed on the display screen;

a display information dividing section for dividing the display information object into a plurality of partial display information objects on the basis of attribute information embedded in the display information object;

an icon creating section for creating a split display icon for indicating positions of split display areas which are in a one-to-one correspondence with the partial display information objects within the entire display screen;

a display controlling section for displaying the split display icon in a peripheral area of the display screen; and an icon designating portion for designating one of the split display areas in the split display icon, wherein the display controlling section is adapted to display on a greater scale a partial display information object corresponding to the designated split display area on the entire display screen.

2. A display screen processing apparatus according to claim 1 further comprising a display format selecting portion for selecting either one of a first display format and a second display format, the first display format allowing the display information object to be displayed on the entire display screen, the second display format allowing the partial display information object corresponding to the split display area designated in the split display icon to be displayed on the entire display screen, wherein the display controlling section is constructed such that, if the second display format is selected by the display format selecting portion, the split display icon is displayed in the peripheral portion of the display screen and, if the first display format is selected by the display format selecting portion, the split display icon is not displayed on the display screen.

3. A display screen processing apparatus according to claim 2, wherein the display format selecting portion comprises a selection button for indicating its display format selecting function and a selection status, and the display controlling section is adapted to display the selection button in a peripheral portion of the display screen and to alternately switch between the first display format and the second display format on the basis of the status of the selection button.

4. A display screen processing apparatus according to claim 1, wherein the display information acquiring section further comprises an interface portion that allows for communications with a WWW server storing therein HTML information of a hypertext via a communication network, and the display information acquiring section is adapted to acquire the HTML information as the display information object via the interface portion.

5. A display screen processing apparatus according to claim 4, wherein the display information dividing section is adapted to divide one HTML information object into a plurality of partial display information objects on the basis of column frame information and row frame information embedded in the HTML information object acquired by the display information acquiring section.

6. A storage medium containing thereon a computer program for controlling a display screen processing apparatus having a display screen, the computer program performing the functions of:

causing a computer operation to acquire a display information object to be displayed on the display screen by means of a display information acquiring section;

causing a computer operation to divide the display information object into a plurality of partial display information objects on the basis of attribute information embedded in the display information object by means of a display information dividing section;

causing a computer operation to create a split display icon for indicating positions of a plurality of split display areas which are in a one-to-one correspondence with the partial display information objects within the entire display screen by means of an icon creating section;

causing a computer operation to display the split display icon in a peripheral area of the display screen by means of a display controlling section; and causing a computer operation to display on a greater scale a partial display information object corresponding to the designated split display area on the entire display screen when one of the split display areas in the split display icon is designated by means of an icon designating portion.

* * * * *